United States Patent [19]

Beichler

[11] Patent Number: 4,939,722

[45] Date of Patent: Jul. 3, 1990

[54] TIME DIVISION MULTIPLEXER HAVING DATA RATE AND NUMBER OF CHANNELS FLEXIBILITY

[75] Inventor: Richard A. Beichler, Huntsville, Ala.

[73] Assignee: Universal Data Systems, Inc., Huntsville, Ala.

[21] Appl. No.: 318,987

[22] Filed: Mar. 6, 1989

[51] Int. Cl.$^5$ .......................... H04J 3/04; H04J 3/22
[52] U.S. Cl. ........................................ 370/84; 370/112
[58] Field of Search ..................... 370/112, 84, 110.1; 377/64, 66, 70, 73, 75; 307/241, 243; 328/60, 61, 104, 105, 137, 152, 153, 154

[56] References Cited

U.S. PATENT DOCUMENTS

| | | | |
|---|---|---|---|
| 3,995,119 | 11/1976 | Pachynski, Jr. | 370/112 |
| 4,317,198 | 2/1982 | Johnson | 370/112 |
| 4,617,658 | 10/1986 | Walters | 370/84 |
| 4,675,861 | 6/1987 | Uttermark | 328/104 |
| 4,789,984 | 12/1988 | Swartz | 370/112 |
| 4,791,628 | 12/1988 | Swartz | 370/112 |

Primary Examiner—Douglas W. Olms
Assistant Examiner—Wellington Chin
Attorney, Agent, or Firm—Charles L. Warren

[57] ABSTRACT

A plurality of multiplexer cells are connected in series to accommodate the multiplexing of different data and channels. Pairs of variable lengths shift registers are utilized in each multiplexer cell in order to accommodate different data rates. One of the shift registers is always connected in series with the multiplex data stream while the other is connected to receive and store channel data. The two registers are alternately connected to baseband data stream and channel data in order to accomplish the multiplexing function.

16 Claims, 2 Drawing Sheets

TIME DIVISION MULTIPLEXER HAVING DATA RATE AND NUMBER OF CHANNELS FLEXIBILITY

BACKGROUND OF THE INVENTION

This invention is generally directed to time division multiplexers and more specifically to hardware based implementations of same.

Hardware based time division multiplexers can be implemented by custom LSI integrated circuits (IC's) and by discrete logic elements. The LSI integrated circuit offers an efficient method of implementing a time division multiplexer but is relatively costly. Also, any enhancements of the basic multiplexer design after fabrication of the custom IC requires another design and another LSI IC.

Implementation of a multiplexer by discrete logic integrated circuits is relatively inexpensive and offers a design which can be easily modified. However, conventional discrete logic implementations suffer from the disadvantage that the amount of integrated circuits required increases substantially when a large range of data rates are required or a large number of channels is needed.

Discrete logic multiplexer approaches may use two shift registers: one to store channel data at a channel clock rate and the other to clock out channel data to the multiplex channel at the baseband rate. Normally, serial-out, parallel-in shift registers are used so that channel data can be quickly loaded from one register to the other via parallel transfer and serially clocked out of the loaded register to the multiplex channel. Such shift resgisters are available in six, seven, and eight bit lengths. Thus, when there is a need for more than eight bits multiple shift registers must be used.

SUMMARY OF THE INVENTION

It is an object of the present invention to provide an improved time division multiplexer which easily accommodates a variety of data rates and number of data channels.

In accordance with the present invention, one embodiment provides an N-channel time division multiplexer which generates baseband date at a first data rate based upon N lower speed data channels. The multiplexer includes N multiplexer cells each having a baseband data input and a baseband data output. The cells are connected in series so that the baseband data output of one cell is connected to the baseband data input of the next cell.

Each of the multiplexers cells include first and second storage registers for storing data. An input gating circuit serially loads one of the storage registers with channel data while serially loading the other register with baseband data. Gating circuitry alternately loads each of the registers with channel data and baseband data. Data stored in the registers are clocked serially out as new data is serially loaded. An output gating circuit selects the output of the register which is being loaded with baseband data. The selected output comprises out output baseband data.

PREFERRED EMBODIMENTS

An important aspect of the present invention resides in the modular design of multiplexer cells which can be connected in series to easily construct a time division multiplexer which can accommodate a selectable number of channels with different channel rates. This allows the user to match his exact needs to a specific implementation while minimizing costs.

Figure 1:
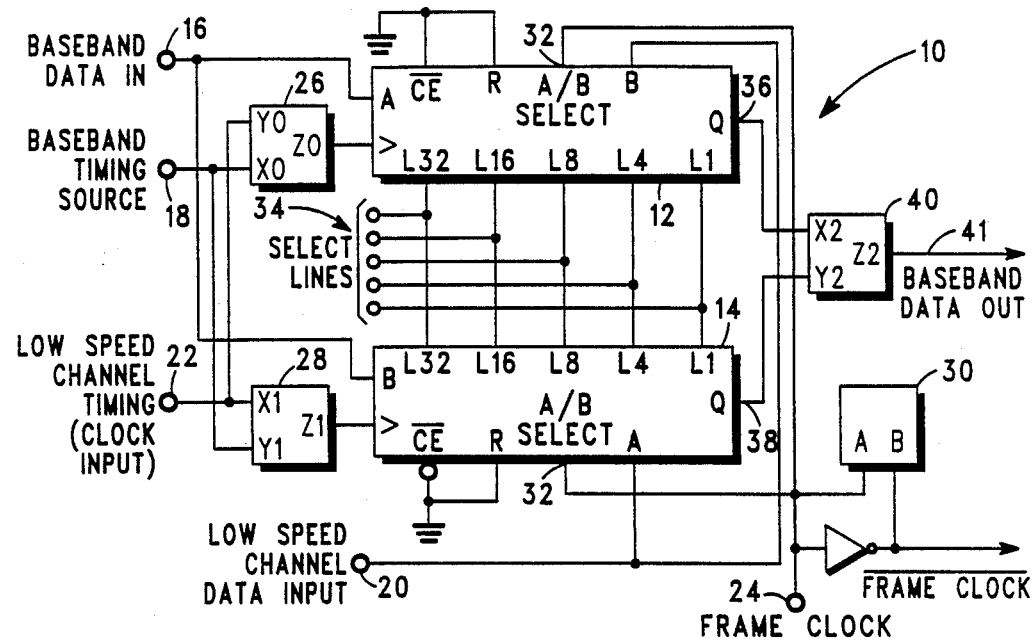
FIG. 1 is a schematic diagram of a multiplexer cell according to the present invention.

Referring to FIG. 1, an embodiment 10 of a multiplexer cell according to the present invention includes a first and second storage element 12 and 14. These elements preferably consist of serial-in, serial-out devices such as shift registers, and preferably consist of a variable length shift register such as a MCI14557B register available from Motorola, Inc.

Each cell includes a baseband data input 16, baseband timing source or clock input 18, low speed channel data input 20, low speed channel clock input 22 and frame clock input 24. The channel clock input 22 is normally provided by the source of the channel data. The baseband timing and frame clock are a function of the specific design of the multiplexer and are generally a function of the number of channels and the channel rates. The timing signals will be discussed further in reference to FIG. 2.

Digital switches 26 and 28 form an input gating circuit for controlling the input clock source to registers 12 and 14. The switches serve to provide the proper clock signal to the registers depending on whether the register is to receive baseband data or channel data. These switches are controlled by switch controller 30 which operates based on the frame clock 24. These switches and the controller are available in a CMOS IC type 4519.

The registers 12 and 14 each have two data inputs controlled by select line 32. As seen in FIG. 1 the baseband data is connected to the A data input of one register and the B data input of the other register. Similarly, the channel data is connected to the B input of one register and the A data input of the other register. Thus, one state of select line 32 will cause register 12 to receive baseband data while register 14 receives channel data; the other state will cause register 12 to receive channel data while register 14 receives baseband data. The input switches 26 and 28 control the clock inputs to the registers such that the corresponding appropriate clock is connected dependent on which data input is selected.

Register control inputs labelled L1, L2, L4, L8, L16 and L32 comprise binary input select lines 34 which are used to program the length of the preferred shift register from 1 to 64 bits. The select lines may be controlled by manual switches or may be controlled by a microprocessor to set the shift register length for a multiplexer cell. Since this multiplexer cell does not provide excess data storage for channel data beyond the data stored during a frame, it is important that both registers be set to a length equal to the length of channel data bits to be stored during one frame. This will cause the register receiving the channel data input to be filled without overflow during each frame.

As data is serially clocked into each register, the contents of the register are serially shifted out to outputs 36 and 38, respectively. These outputs form inputs to digital switch 40 which is also controlled by control switch 30. This switch provides output gata control so that the output from the register which has baseband data being clocked in is always selected and hence defines the baseband data output.

Referring to FIG. 1, assume that this multiplexer cell 10 is operating under the following conditions: during a frame clock, 8 bits of low speed data will be stored and 24 bits of baseband data will occur. Thus, the baseband data rate is 3 times that of the channel data rate; the channel data occupies one-third of the total available bits being transmitted by the baseband data during each frame clock. In this example, both registers would be set by select lines 34 to function as an 8 bit shift register. Assume that a frame clock has just occurred and that just prior to the clock, register 12 was being loaded with baseband data and that register 14 was being loaded with channel data. Since the clock has occurred, the registers will "flip" and the channel data stored in register 14 will be clocked out at the baseband timing rate followed by an additional 16 bits of baseband data loaded via input terminal 16. Register 12 will be loaded with 8 bits of channel data during this frame. Although the contents of register 12 will be clocked out to its output 36, it will have no effect because switch 40 will be coupling only the output 38 to the baseband data output 41. Thus, the previously stored data in register 12 will be discarded as that register is fully loaded without overflow with channel data during one frame.

At the beginning of a new frame, the previously stored channel data in register 12 will begin to be clocked out at the baseband timing rate followed by 16 additional bits of baseband data. Register 14 will be loaded with 8 bits of channel data during this frame. The input gates 26 and 28 are steering the clock source to the registers in accordance with the data being clocked in.

These two registers functions as bank switches. While one is storing lower speed channel data, the other is clocking out the channel data stored during the prior frame. At the end of each frame, the cycle begins over with the other register now being switched in series with the baseband data and the other register serving to collect low speed channel data during that clock cycle.

Figure 2:
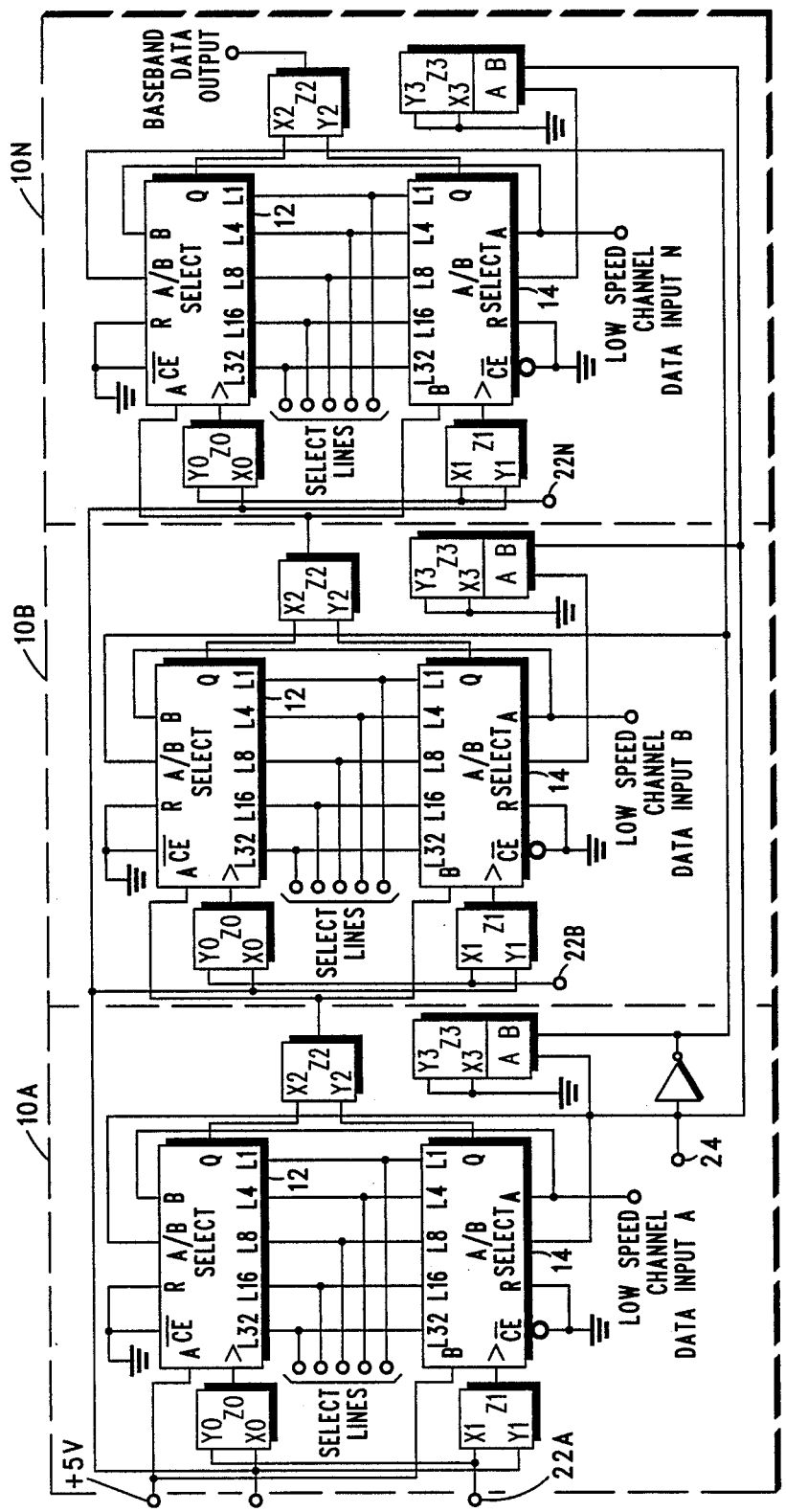
FIG. 2 is a schematic diagram of a time division multiplexer illustrating a plurality of the cells according to FIG. 1 connected serially to form an N-channel time division multiplexer.

FIG. 2 illustrates a time division multiplexer which consists of a plurality of multiplexer cells 10 as described in regard in FIG. 1. As illustrated, cells 10A, 10B, through 10N make up this multiplexer. In cell 10A, it will be seen that there is no baseband data input since this is the first cell in the multiplexer. Each of the cells are connected with the baseband data output of the preceding cell connected to the baseband data input of the following cell. The channel data input and channel clock input to each cell are dependent upon the data input source and timing. The frame clock and baseband timing source are common to each of the cells as is required in order to maintain timing throughout the multiplexer.

Referring to FIG. 2, consider the following example: three multiplexer cells 10A, 10B, and 10N are connected in series as shown and each are connected to channel data ports 1, 2, and N. During a frame, 4 bits will be sent by channel 1, 8 bits by channel 2 and 12 bits by channel N. Thus, the baseband timing source will need to generate 24 clocks (4+8+12) per frame. Assume that a frame clock has just occurred and that just prior to the clock, registers 12 were being loaded with channel data so that these registers in cells 10A, 10B, and 10N contain 4, 8, and 12 bits, respectively. Since the frame clock has occurred, registers 12 are now connected to the baseband timing source which will provide 24 clocks during the frame and serve to serially clock each of the stored channel data bits out of the baseband data output of cell 10N during the frame. The left most bit stored in register 12 of cell 10A will be the last bit clocked out of baseband data output of cell 10N during the frame. While the baseband data is being clocked at the higher rate, registers 14 in cells 10A, 10B, and 10N will be filled with 4, 8, and 12 bits, respectively. At the end of the frame, registers 14 will be connected in series and will be driven by the baseband clock source to clock out the next baseband frame of information. This cycle keeps repeating thereby providing a continuous baseband data flow in which the individual data channels are time division multiplexed into a higher output data stream.

Figure 3:
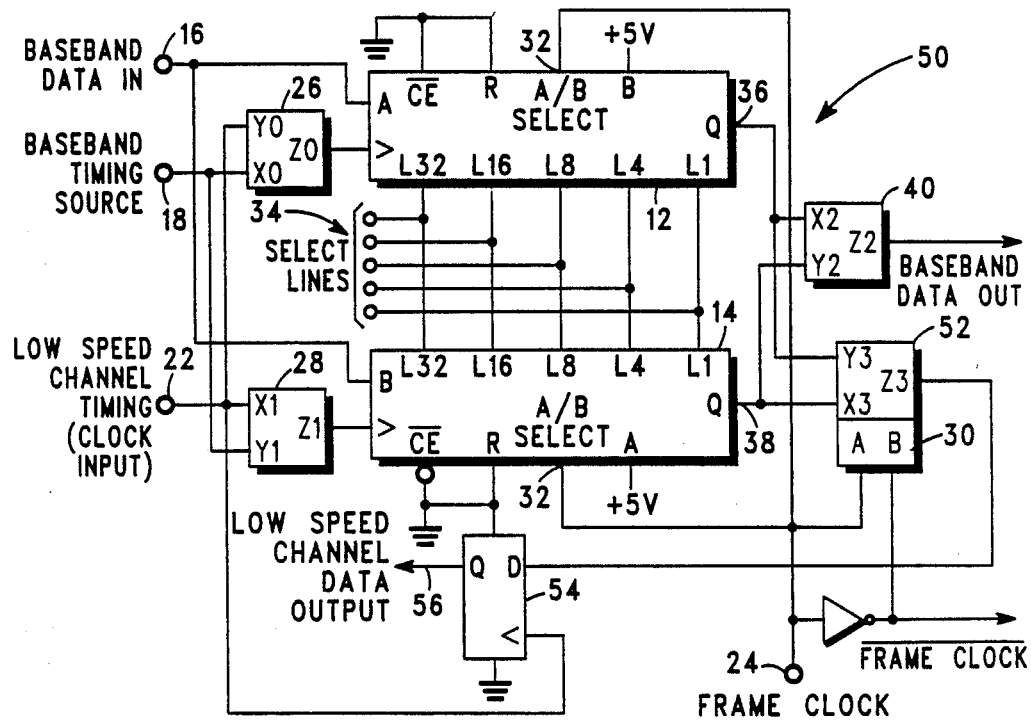
FIG. 3 is a schematic diagram of a demultiplexer cell according to the present invention.

FIG. 3 illustrates an embodiment of a demultiplexer 50 in which like numerals refer to like elements. The demultiplexer cell 50 functions similarly to the multiplexer cell 10 in the alternate switching and control of the inputs and outputs of registers 12 and 14. Since the purpose of the demultiplexer is to recover and separate the corresponding channel data from the baseband data stream, the register not connected in series with the baseband data stream will contain the corresponding data for the particular channel.

Two new circuit elements are utilized in demultiplexer cell 50 and consist of an additional digital switching device 52 also controlled by switch controller 30 and a flip-flop 54 which serves as a 1 bit delay. Assume that register 14 during the previous frame was connected in series with the baseband data steam. At the end of that frame, it will contain the data bits for the corresponding data channel. At the beginning of the current frame, channel clock 22 will cause the stored data bits in register 14 to be clocked by output 38 through digital switch 52 to flip-flop 54 which will then cause the data to be output to the channel data output 56. The 1 bit buffer provided by flip-flop 54 is required because data is clocked out of the MC14557B on the rising edge of the channel clock. The are X positive transitions and X+1 negative transitions of the channel clock. Thus, a 1 bit buffer is needed during demultiplexing to prevent the "extra" bit from being clocked to the data channel during demultiplexing. During the next frame clock the contents of register 12 will likewise be clocked to channel data output 56.

Just as the multiplexer is made of a series of multiplexer cells, the demultiplexer is made of a series of demultiplexer cells 50 which are also connected so that the baseband data output of one cell is connected to the following baseband data input of the next cell. It is believed those having ordinary skill in this art will readily appreciate the construction and opertion of a demultiplexer in accordance with the present invention.

The present invention provides a modular concept to multiplexing in which a plurality of channels can be accommodated to meet different user demands in different situations. Further, different data rates can be accommodated in addition to the different number of data channels to provide a truly flexible multiplexing design. Since multiplexer and demultiplexer cells can be added as desired for a given application, expense is minimized since additional circuitry or functions which are not required for particular applications need not be purchased.

Although a preferred embodiment of the present invention has been described and shown in the drawings, the scope of the present invention is defined by the claims which follow.

What is claimed is:

1. A time division multiplexer cell for receiving baseband data at a first rate and channel data at a second rate comprising:

first and second storage means for storing data, each of said storage means having an output;
   input gating means for serially loading one of said first and second storage means with said channel data at said second rate while serially loading the other of said first and second storage means with said baseband data at said baseband rate, said input gating means alternately loading each of said storage means with channel data and baseband data, data stored in the first and second storage means being serially output as data is serially loaded;
   output gating means for selecting the output of the one of said first and second storage means which is being loaded with baseband data, said selected output defining the output baseband data.

2. The multiplexer cell according to claim 1 wherein said first and second storage means each comprise variable length shift registers which are each set to the same length.

3. An N-channel time division multiplexer for generating baseband data at a first rate based upon N data channels comprising:

N multiplexer cells each having a baseband data input and a baseband data output, said cells connected in series such that the baseband data output of one cell is connected to the baseband data input of the next cell;
   each of said cells comprising:
      first and second storage means for storing data, each of said means having an output;
      input gating means for serially loading one of said first and second storage means with said channel data while serially loading the other of said first and second storage means with said baseband data at said baseband rate, said input gating means alternately loading each of said storage means with channel data and baseband data, data stored in the first and second storage means being serially output as data is serially loaded;
      output gating means for selecting the output of the one of said first and second storage means which is being loaded with baseband data, said selected output defining the output baseband data.

4. The multiplexer according to claim 3 wherein said first and second storage means in each cell comprise variable length shift registers, said shift registers in a cell are each set to the same length.

5. The multiplexer according to claim 4 wherein the length of the registers in each cell is predetermined in accord with the corresponding channel data rate so that the register being loaded with channel data is filled without overflow prior to said input gating means causing baseband data to be loaded.

6. The multiplexer according to claim 3 wherein the length of the storage means in each cell is predetermined in accord with the corresponding channel data rate so that the storage means being loaded with channel data is filled without overflow prior to said input gating means causing baseband data to be loaded.

7. The multiplexer cell according to claim 1 wherein the length of the first and second storage means is predetermined in accord with the channel data rate so that the storage means being loaded with channel data is filled without overflow prior to said input gating means causing baseband data to be loaded.

8. A time division demultiplexer cell for receiving baseband data having a first data rate and predetermined frames, and deriving channel data at a second rate from the baseband data, the demultiplexer comprising:

first and second storage means for storing data, each of said storage means having an output;
   input gating means for serially loading one of said first and second storage means with said baseband data at said first rate, said input gating means alternately loading frames of baseband data into said first and second storage means, data stored in the first and second storage means being serially output as data is serially loaded;
   output gating means for selecting the output of the one of said first and second storage means which is being loaded with baseband data, said selected output defining the output baseband data;
   means for sending said channel data stored in the other of the first and second storage means not selected by said output gating means to a channel data output terminal.

9. The demultiplexer cell according to claim 8 wherein said first and second storage means each comprise variable length shift registers which are each set to the same length.

10. An N-channel time division demultiplexer for recovering N channels of data from data received at a first rate and in predetermined frames comrising:

N demultiplexer cells each having a baseband data input, a baseband data output and a channel data output, said cells connected in series such that the baseband data output of one cell is connected to the baseband data input of the next cell;
    each of said cells comprising:
       first and second storage means for storing data, each of said storage means having an output;
       input gating means for serially loading one of said first and second storage means with said baseband data at said first rate, said input gating means alternately loading frames of baseband data into said first and second storage means, data stored in the first and second storage means being serially output as data is serially loaded;
       output gating means for selecting the output of the one of said first and second storage means which is being loaded with baseband data, said selected output defining the output baseband data;
       means for sending said channel data stored in the other of the first and second storage means not selected by said output gating means to a channel data output terminal.

11. The demultiplexer according to claim 10 wherein said first and second storage means in each cell comprise variable length shift registers, said shift registers in one cell are each set to the same length.

12. The demultiplexer according to claim 11 wherein the length of the registers in each cell is predetermined in accord with the corresponding channel data rate so that the register length equals the number of bits of channel data.

13. The demultiplexer according to claim 10 wherein the length of the storage means in each cell is predetermined in accord with the corresponding channel data rate so that the storage means length equals the number of bits of channel data.

14. The demultiplexer cell according to claim 8 wherein the length of the first and second storage means is predetermined in accord with the channel data rate so that the storage means length equals the number of bits of channel data.

15. A time division multiplexing method in which baseband data is received at a first rate and channel data at a second rate comprising the steps of:
   storing said baseband data in a first storage location and said channel data in a second storage location during one frame;
   storing said baseband data in said second location and said channel data in said first storage location during the next frame;
   alternately selecting on a frame basis one of the first and second storage locations to be used to output baseband data so that the one of said first and second storage locations selected to output baseband data during one frame received channel data during the preceding frame.

16. A time division demultiplexing method for receiving baseband data at a first data rate in predetermined frames, and deriving channel data at a second rate from the baseband data, said method comprising the steps of:
   storing said baseband data in a first storage location and said channel data in a second storage location during one frame;
   storing said baseband data in said second location and said channel data in said first storage location during the next frame;
   alternately selecting on a frame basis one of the first and second storage locations to be used to output channel data so that the one of said first and second storage locations selected to output channel data during one frame received baseband data during the preceding frame.

* * * * *

UNITED STATES PATENT AND TRADEMARK OFFICE
CERTIFICATE OF CORRECTION

PATENT NO. : 4,939,722

DATED : July 3, 1990

INVENTOR(S) : Richard A. Beichler

It is certified that error appears in the above-identified patent and that said Letters Patent is hereby corrected as shown below:

In Column 5, line 41, insert -- storage -- after "said".

In Column 7, line 2, insert -- during one of said frames -- after "data".

In Column 7, line 7, insert -- during one of said frames -- after "data".

In Column 7, line 13, insert -- during one of said frames -- after "data".

Signed and Sealed this

Thirteenth Day of April, 1993

Attest:

STEPHEN G. KUNIN

*Attesting Officer*         *Acting Commissioner of Patents and Trademarks*